US005257013A

United States Patent [19]

Lewkowicz

[11] Patent Number: 5,257,013

[45] Date of Patent: Oct. 26, 1993

[54] PROTECTING UV FLAME DETECTING APPARATUS

[75] Inventor: Mike Lewkowicz, Wayside, N.J.

[73] Assignee: Life Light, Inc., Oakhurst, N.J.

[21] Appl. No.: 6,696

[22] Filed: Jan. 21, 1993

Related U.S. Application Data

[63] Continuation of Ser. No. 617,627, Nov. 26, 1990, abandoned.

[51] Int. Cl.[5] .......... G08B 17/12; G01J 1/42

[52] U.S. Cl. .......... 340/578; 250/372; 340/693

[58] Field of Search .......... 340/578, 693; 250/372

[56] References Cited

U.S. PATENT DOCUMENTS

| | | | |
|---|---|---|---|
| 3,728,675 | 4/1973 | Horn et al. | 340/571 X |
| 3,775,762 | 11/1973 | Trumble | 340/578 |
| 3,781,842 | 12/1973 | Campman | 340/555 |
| 3,943,499 | 3/1976 | Dunphy | 340/693 X |
| 3,971,943 | 7/1976 | Jeunehomme et al. | 250/372 |
| 3,990,518 | 11/1976 | Hemme | 340/577 X |
| 4,241,258 | 12/1980 | Cholin | 250/372 |
| 4,358,760 | 11/1982 | Palmer | 340/693 X |
| 4,455,487 | 6/1984 | Wendt | 340/578 X |
| 4,540,980 | 9/1985 | Porco | 340/693 X |
| 4,639,605 | 1/1987 | Seki et al. | 340/578 X |
| 4,765,413 | 8/1988 | Spector et al. | 250/372 X |
| 4,929,093 | 5/1990 | Suzuki et al. | 340/693 X |

*Primary Examiner*—Thomas Mullen
*Attorney, Agent, or Firm*—Lerner, David, Littenberg, Krumholz & Mentlik

[57] ABSTRACT

Flame detecting apparatus is disclosed for detecting the presence of ultraviolet radiation indicating the presence of a fire. The apparatus itself includes a housing with at least one aperture, an alarm and a UV detector extending through the aperture for triggering the alarm, and protective wings disposed about the aperture to protect the UV detector without blocking same from the ultraviolet radiation.

25 Claims, 2 Drawing Sheets

PROTECTING UV FLAME DETECTING APPARATUS

This is a continuation, of application Ser. No. 07/617,627 filed Nov. 26, 1990, now abandoned.

BACKGROUND OF THE INVENTION

This invention relates generally to fire detectors, and more particularly to flame detecting apparatus having ultraviolet (UV) flame detecting means to trigger an audible alarm upon the detection of UV radiation from a fire. The flame detecting apparatus is provided with protection means to protect the UV detecting means while simultaneously maintaining sufficient exposure of the UV detecting means for detecting the presence of UV radiation.

It is known that fires produce a detectable amount of UV radiation. The concept of providing UV-sensitive detectors for fire detection systems has been shown in the prior art. However, a problem existing in this area is that the UV detector, usually a photodiode, is quite fragile and needs to be protected from possible damage that could occur from installation, removal, and/or repair of the fire detector. Furthermore, in areas where ceilings may be low or in areas where objects are substantially close to the fire detector, it is desirable to provide effective protection of the UV detector. This protection, however, must not significantly reduce the sensitivity of the UV detector. Namely, the UV detector must not be covered or surrounded by any material which would interfere with its ability to detect the presence of UV radiation, while at the same time, the UV detector must be adequately protected from possible damage.

In addition, primarily in order to protect these prior devices, it has been necessary to mount these devices in the nature of a camera, at a location "aimed" at a specified area, and thus not achieving 360°, or non-directional exposure. The prior art has not adequately addressed these problems of providing the necessary protection of a UV detector while sufficiently exposing the detector to detect UV radiation emitted from a fire.

In Trumble, U.S. Pat. No. 3,775,762, a fire detecting system is disclosed that is intended to reliably discriminate between UV radiation from a flame and UV radiation from other emitting sources. However, this system is primarily directed at a logic circuit for accomplishing such discrimination, and fails to disclose any type of protection means for the detector or even a structural housing for protecting the UV detector while maintaining sufficient exposure to the surrounding area.

Wendt, U.S. Pat. No. 4,455,487, and Spector et al., U.S. Pat. No. 4,765,413, disclose radiation detection apparatus that utilizes both UV and IR (infrared) radiation detection to increase reliability in discriminating between flame and non-flame radiation. Similarly, both references lack a housing structure with protection means to protect and sufficiently expose either the UV or IR detectors.

In Hemme, U.S. Pat. No. 3,990,518, an automatic fire alarm and extinguishing device with a housing is disclosed. Fire sensing elements are disposed to project through openings in the housing, and although the detectors are exposed to the surrounding area, they are unprotected from possible damage.

Seki et al., U.S. Pat. No. 4,639,605, discloses a fire sensor device having a condenser lens disposed in front of a photoelectric conversion element. However, UV radiation must pass through the lens before reaching the detector and thus the detector must be situated behind the lens and thus cannot be sufficiently exposed to the surrounding area.

In Cholin, U.S. Pat. No. 4,241,258, a UV translating detection device is disclosed which utilizes phosphor to translate UV wavelengths into visible or near-IR wavelengths. This translation process, however, involves the use of either quartz and glass windows together, a quartz prism, or a diffraction grating through which the UV radiation must pass. After passing through a window or prism, the UV radiation is directed to a layer of phosphor which will then fluoresce when exposed to the UV radiation. This florescence of the phosphor is then detected by photosensitive solid state detection cells.

The UV translation process described in Cholin has some deficiencies. Namely, the translation system can be costly by requiring the use of quartz and glass windows together, prisms, or diffraction gratings, through which the UV radiation must pass. Additionally, the use of a window composed of quartz or glass may fail to provide adequate fire detection, namely because some amount of UV radiation will not transmit through these materials. Furthermore, the UV detector is enclosed completely within the housing and as such, will not be optimally exposed to the surrounding area for the maximum detection of UV radiation emitted from a fire.

Accordingly, the present invention attempts to overcome these deficiencies in the prior art by providing flame detecting apparatus having flame detecting means including UV detecting means for triggering an audible alarm upon the detection of a predetermined amount of UV radiation. Furthermore, protective means are provided to protect the UV detecting means and to sufficiently expose the UV detecting means to the surrounding area to detect UV radiation emitted from a fire, and to provide 360° coverage to do so in a manner so as to cover as large an area as possible.

Therefore, it is an object of the present invention to provide flame detecting apparatus having UV detecting means protected by protective means while being sufficiently exposed to the surrounding area to detect the presence of UV radiation.

It is another object of the present invention to provide flame detecting apparatus where the protective means includes a plurality of wing members disposed substantially perpendicular to the UV detecting means whereby the wing members do not significantly interfere with the detecting of UV radiation.

It is another object of the present invention to provide flame detecting apparatus where the protective means includes a hollow ring member extending circumferentially around the UV detecting means and attached to the wing members whereby the UV detecting means is protected while remaining sufficiently exposed through the hollow ring member to detect UV radiation.

It is yet another object of the present invention to provide flame detecting apparatus where the protective means is formed as an integral part of the exterior of the housing.

These and other objects will become apparent, as will a better understanding of the concepts underlying the present invention, by reference to the description which follows when taken in conjunction with the accompanying drawings.

SUMMARY OF THE INVENTION

In accordance with the present invention flame detecting apparatus has now been discovered for detecting the presence of UV radiation from a fire comprising a housing having an interior, an exterior, and at least one aperture in the housing, flame detecting means including alarm means and UV detecting means disposed relative to and extending through the aperture for triggering the alarm means upon the detection of a predetermined amount of UV radiation, and protective means on the exterior of the housing and disposed relative to the aperture so that the UV detecting means is protected while being sufficiently exposed to detect the predetermined amount of UV radiation.

DETAILED DESCRIPTION

Figure 1:
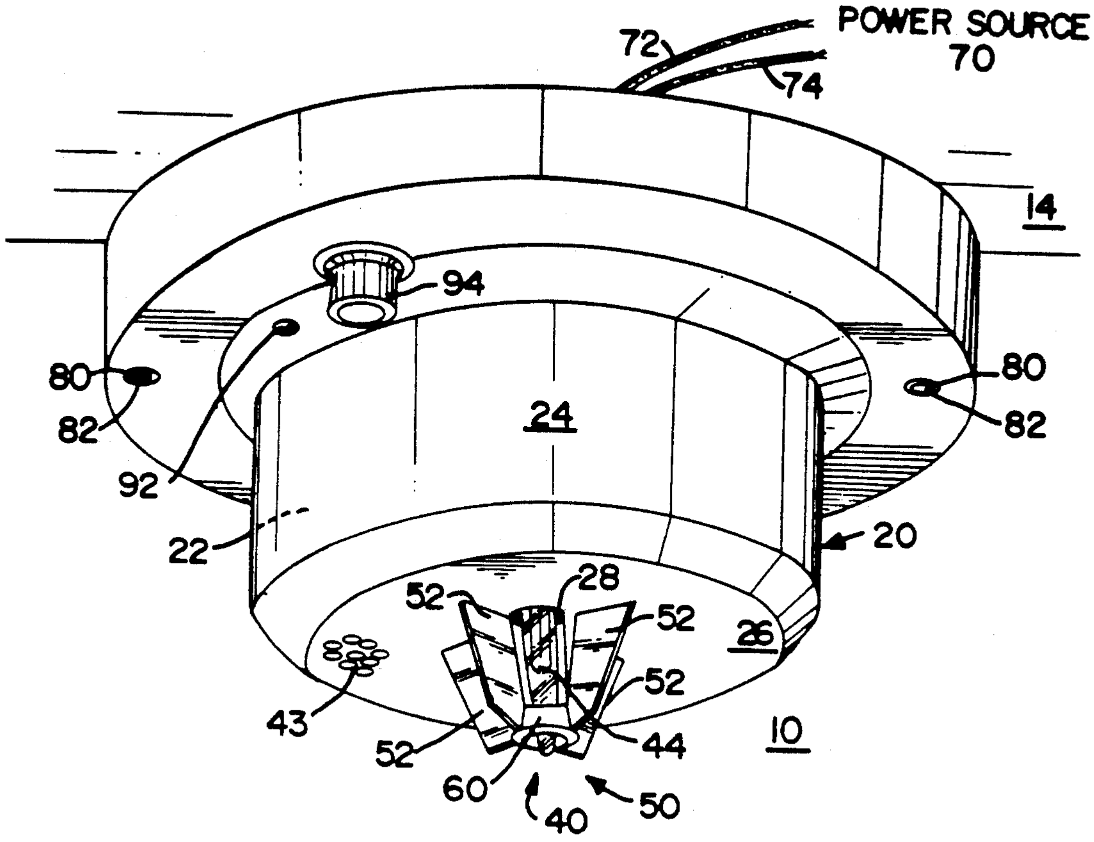
FIG. 1 is a front, perspective view of the flame detecting apparatus in accordance with the present invention.
Figure 2:
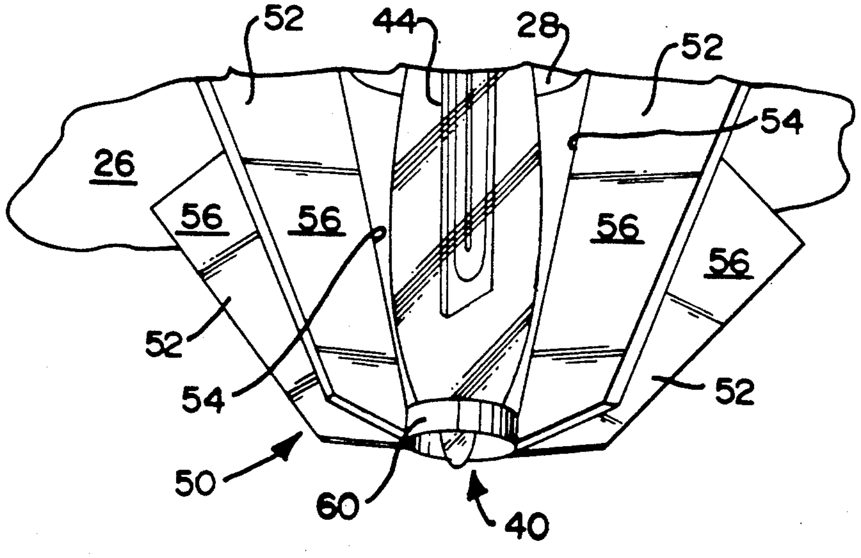
FIG. 2 is an enlarged, front view of a portion of the flame detecting apparatus shown in FIG. 1.
Figure 3:
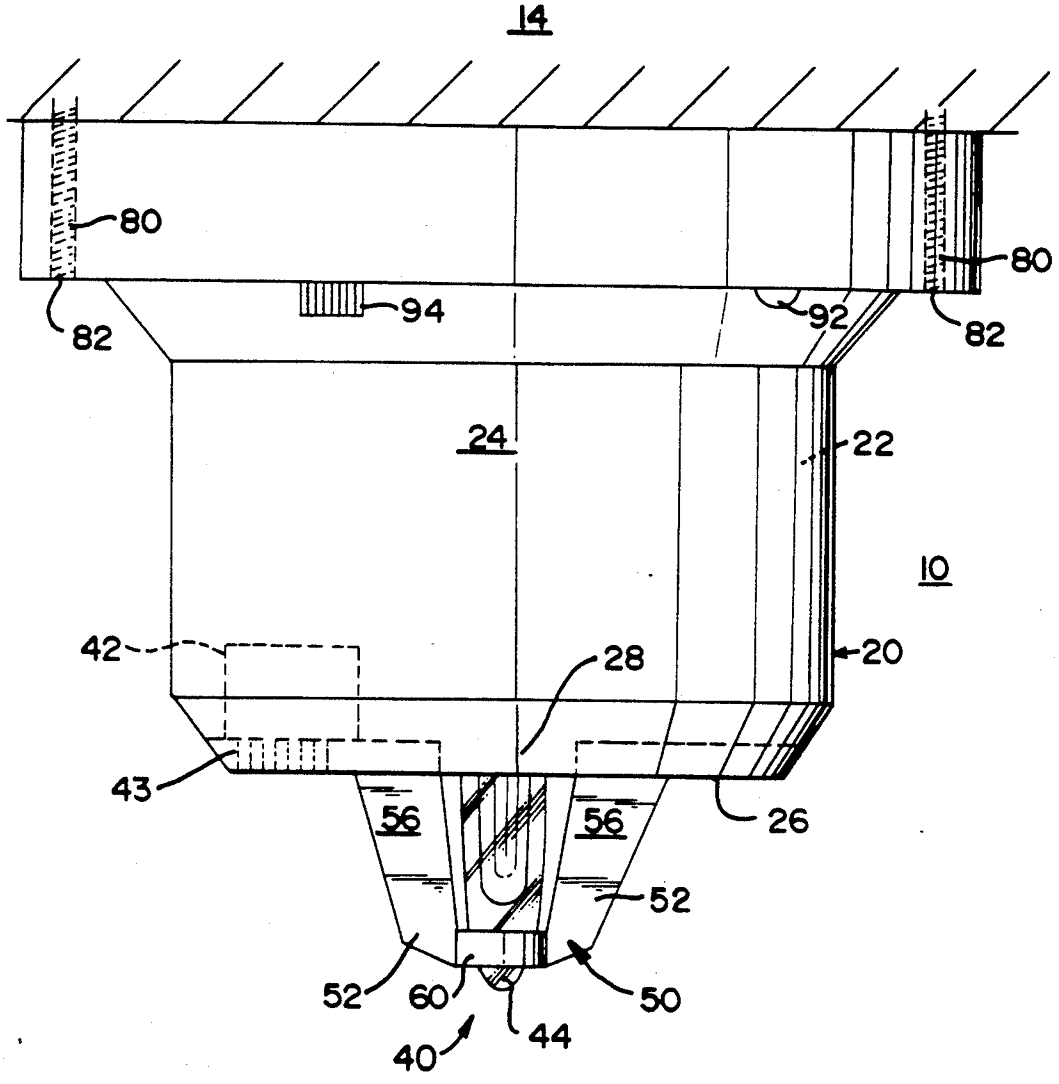
FIG. 3 is a side, elevational, view of the flame detecting apparatus shown in FIG. 1.

Referring to the FIGURES, in which like numbers refer to like portions thereof, FIGS. 1-3 illustrate a preferred embodiment of the UV flame detecting apparatus generally designated as 10, in accordance with the present invention.

The UV flame detecting apparatus 10 is preferably formed for mounting on a ceiling 14 in a room, and includes a generally cylindrical housing 20 made of injection molded plastic or any other suitable material and having an interior 22 defined by an exterior surface 24 extending perpendicularly downward from the ceiling 14, and a bottom surface 26 generally parallel to the ceiling 14. Housing 20 which encloses the detector circuitry and provides a pleasing aesthetic appearance further includes an aperture 28 centrally disposed on bottom surface 26 and flame detecting means generally designated as 40, disposed relative to aperture 28.

Flame detecting means 40 includes alarm means 42, preferably consisting an audible horn disposed in interior 22 of housing 20 and positioned relative to sound apertures 43 located on bottom surface 26 of housing 20. In other arrangements, alarm means 42 may also be adapted to send a warning signal to a remote monitoring station or to a firefighting station. Flame detecting means 40 further includes UV detecting means 44, preferably consisting of a vacuum photodiode sensitive to UV radiation emitted from a flame. UV detecting means 44 extends perpendicularly from the interior 22 of housing 20 through aperture 28 such that it is sufficiently exposed to the surrounding area to detect the presence of UV radiation. This device can thus be mounted in a room or other area much like concentric smoke detectors, and provide 360° coverage within that area. This does not therefore require that the UV detector be "aimed" like a camera at a particular defined location, as is the case with prior art devices.

Flame detecting apparatus 10 further includes protective means 50 disposed substantially perpendicular to aperture 28 and substantially parallel to UV detecting means 44. In a preferred embodiment, protective means 50 includes a plurality of wing members 52 extending perpendicularly downward from housing 20 and disposed circumferentially around aperture 28. Each back edge 54 of wing members 52 faces towards UV detecting means 44 while each side surface 56 of wing members 52 projects perpendicularly away from UV detecting means 44. Back edges 54 of wing members 52 are sufficiently narrow relative to the exposed surface area of UV detecting means 44 to allow sufficient exposure of UV detecting means 44 to the surrounding area, while side surfaces 56 are sufficiently wide to provide adequate protection and stabilization of UV detecting means 44.

In a preferred embodiment of the present invention, a hollow ring 60 is provided circumferentially around the end of UV detecting means 44 and attached to back edges 54 of wing members 52. Hollow ring 60 is provided for additional stabilization of wing members 52 while allowing sufficient downward exposure of UV detecting means 44 to detect the presence of UV radiation in the 360° manner discussed above.

Protective means 50, including wing members 52 and hollow ring 60, is preferably formed from injection molded plastic and is an integral part of bottom surface 26 of housing 20.

In operation, UV flame detecting apparatus 10 is connected to a power source 70 by conducting means comprising leads 72 and 74 and then mounted on the ceiling 14 with mounting screws 82 through mounting holes 80. It should be noted that a rechargeable battery (not shown) may be provided in the event of a power failure and rectifying means to permit the operation of the UV flame detecting apparatus 10 by AC or DC power. While power is being supplied to UV flame detecting apparatus 10, on/off LED 94 will remain illuminated to indicate the detector is ready and operational. Upon detection of a predetermined amount of UV radiation by UV detecting means 44, alarm means 42 will be activated and will transmit an audible warning signal through sound apertures 43 into the surrounding area. During the detection of the UV radiation, detecting LED 92 will remain illuminated as an additional indicator and in the event that alarm means 42 cannot be heard.

While the above description and FIGURES illustrate one preferred embodiment of the present invention, it should be appreciated that certain modifications may be made in the structure and operation of the disclosed embodiment without departing from the spirit and scope of the present invention as defined by the claims which are set forth immediately below.

What is claimed is:

1. Flame detecting apparatus for detecting the presence of UV radiation from a fire comprising:

(a) a housing having an interior, an exterior, and at least one aperture in said housing;

(b) flame detecting means including alarm means and UV detecting means disposed relative to and extending through said aperture for triggering said alarm means upon the detection of a predetermined amount of UV radiation, said UV detecting means having a longitudinal axis coincident with a longitudinal axis of said housing; and (c) protective means on said exterior of said housing, said protective means including a plurality of wing members each disposed substantially coplanar with a respective straight line projecting radially from said longitudinal axis of said UV detecting means, whereby said plurality of wing members do not significantly interfere with the detecting by said UV detecting means, and a hollow ring member extending circumferentially around said UV detecting means and attached to said plurality of wing members so that said UV detecting means is protected while being sufficiently exposed to detect said predetermined amount of UV radiation.

2. The flame detecting apparatus of claim 2, wherein said protective means includes a plurality of said wing members.

3. The flame detecting apparatus of claim 1, wherein said protective means is formed as an integral part of said exterior of said housing.

4. The flame detecting apparatus of claim 1, wherein said flame detecting means includes conductor means for coupling said flame detecting means to a power source.

5. The flame detecting apparatus of claim 1, wherein said UV detecting means includes a vacuum photodiode.

6. The flame detecting apparatus of claim 1, wherein said alarm means includes audible horn means adapted to produce an audible alarm signal upon detection of said predetermined amount of UV radiation.

7. The flame detecting apparatus of claim 6, wherein said housing includes a plurality of sound apertures positioned relative to said audible horn means.

8. The flame detecting apparatus of claim 1, wherein said alarm means includes indicator light means adapted to indicate the detecting status of said flame detecting means.

9. The flame detecting apparatus of claim 8, wherein said indicator light means includes one or more light-emitting diodes.

10. Flame detecting apparatus for detecting the presence of UV radiation from a fire comprising:

(a) a housing having an interior, an exterior, and at least one aperture in said housing;

(b) flame detecting means including alarm means and UV detecting means disposed relative to and extending through said aperture for triggering said alarm means upon the detection of a predetermined amount of UV radiation, said UV detecting means having a longitudinal axis coincident with a longitudinal axis of said housing; and (c) protective means on said exterior of said housing, said protective means including four wing members each disposed substantially coplanar with a respective straight line projecting radially from said longitudinal axis of said UV detecting means, whereby said wing members do not significantly interfere with the detecting by said UV detecting means, and a hollow ring member extending around said UV detecting means and attached to said wing members whereby said UV detecting means is protected while remaining sufficiently exposed through said hollow ring member for detecting UV radiation.

11. The flame detecting apparatus of claim 10, wherein said UV detecting means includes a vacuum photodiode.

12. The flame detecting apparatus of claim 10, wherein said alarm means includes audible horn means adapted to produce an audible alarm signal upon detection of said predetermined amount of UV radiation.

13. The flame detecting apparatus of claim 12, wherein said housing includes a plurality of sound apertures positioned relative to said audible horn means.

14. The flame detecting apparatus of claim 10, wherein said alarm means includes indicator light means adapted to indicate the detecting status of said flame detecting means.

15. Flame detecting apparatus for detecting the presence of UV radiation from a fire comprising:

(a) a housing having an interior, an exterior including a bottom surface, and at least one aperture in said bottom surface of said housing;

(b) flame detecting means including alarm means and UV detecting means disposed relative to and extending through said aperture for triggering said alarm means upon the detection of a predetermined amount of UV radiation, said UV detecting means having a longitudinal axis coincident with a longitudinal axis of said housing; and (c) protective means on said bottom surface of said exterior of said housing and formed as an integral part thereof, said protective means including a plurality of wing members each disposed coplanar with a respective straight line projecting radially from said longitudinal axis of said UV detecting means so as to provide an exposed surface area, said plurality of wing members being sufficiently narrow relative to said exposed surface area of said UV detecting means to permit exposure of said UV detecting means to the surrounding area, said plurality of wing members including side surfaces having a sufficient width for stabilization of said UV detecting means.

16. The flame detecting apparatus of claim 15, wherein said protective means includes a hollow ring member extending circumferentially around said UV detecting means and attached to said plurality of wing members whereby said UV detecting means is protected while remaining sufficiently exposed through said hollow ring member for detecting UV radiation.

17. The flame detecting apparatus of claim 15, wherein said UV detecting means includes a vacuum photodiode.

18. The flame detecting apparatus of claim 15, wherein said alarm means includes indicator light means adapted to indicate the detecting status of said flame detecting means.

19. The flame detecting apparatus of claim 18, wherein said indicator light means includes one or more light emitting diodes.

20. Flame detecting apparatus for detecting the presence of UV radiation from a fire comprising:

(a) a housing having an interior, an exterior, and at least one aperture in said housing;

(b) flame detecting means including alarm means and UV detecting means comprising a vacuum photodiode disposed relative to and extending through said aperture for triggering said alarm means upon the detection of a predetermined amount of UV radiation; and (c) protective means on said exterior of said housing and disposed relative to said aperture so that said vacuum photodiode is protected while being sufficiently exposed to detect said predetermined amount of UV radiation.

21. The flame detecting apparatus of claim 20, wherein said vacuum photodiode has a longitudinal axis coincident with a longitudinal axis of said housing, and said protective means includes a plurality of wing members each disposed substantially coplanar with a respective straight line projecting radially from said longitudinal axis of said vacuum photodiode whereby said plurality of wing members do not significantly interfere with the detecting by said vacuum photodiode.

22. The flame detecting apparatus of claim 21, wherein said protective means includes a hollow ring member extending circumferentially around said vacuum photodiode and attached to said wing members, whereby said vacuum photodiode is protected while remaining sufficiently exposed through said hollow ring member for detecting UV radiation.

23. The flame detecting apparatus of claim 20, wherein said protective means is formed as an integral part of said exterior of said housing.

24. The flame detecting apparatus of claim 20, wherein said alarm means includes audible horn means adapted to produce an audible alarm signal upon detection of said predetermined amount of UV radiation.

25. The flame detecting apparatus of claim 24, wherein said housing includes a plurality of sound apertures positioned relative to said audible horn means.

* * * * *

UNITED STATES PATENT AND TRADEMARK OFFICE
CERTIFICATE OF CORRECTION

PATENT NO. : 5,257,013

DATED : October 26, 1993

INVENTOR(S) : Mike Lewkowicz

It is certified that error appears in the above-identified patent and that said Letters Patent is hereby corrected as shown below:

Column 5, line 7, delete "claim 2" and insert therefor "claim 1".
line 8, delete "a plurality" and insert therefor --four--.

Signed and Sealed this

Fifth Day of April, 1994

Attest:

BRUCE LEHMAN

Attesting Officer

*Commissioner of Patents and Trademarks*